(12) United States Patent
Wiklof

(10) Patent No.: US 10,748,575 B2
(45) Date of Patent: Aug. 18, 2020

(54) RECORDER AND METHOD FOR RETROSPECTIVE CAPTURE

(71) Applicant: KNAPP INVESTMENT COMPANY LIMITED, Road Town, Tortola (VG)

(72) Inventor: Christopher A. Wiklof, Everett, WA (US)

(73) Assignee: KNAPP INVESTMENT COMPANY LIMITED, Tortola (VG)

( * ) Notice: Subject to any disclaimer, the term of this patent is extended or adjusted under 35 U.S.C. 154(b) by 0 days.

(21) Appl. No.: 14/562,033

(22) Filed: Dec. 5, 2014

(65) Prior Publication Data

US 2015/0139605 A1    May 21, 2015

Related U.S. Application Data

(63) Continuation of application No. 12/554,656, filed on Sep. 4, 2009, now Pat. No. 8,942,533, which is a continuation of application No. PCT/US2008/003174, filed on Mar. 7, 2008.

(60) Provisional application No. 60/905,746, filed on Mar. 7, 2007.

(51) Int. Cl.
| | |
|---|---|
| G11B 20/10 | (2006.01) |
| G11B 27/34 | (2006.01) |
| G11B 27/00 | (2006.01) |
| H04N 1/21 | (2006.01) |
| H04N 5/232 | (2006.01) |
| H04N 5/77 | (2006.01) |
| H04N 1/00 | (2006.01) |
| H04N 101/00 | (2006.01) |

(52) U.S. Cl.
CPC ...... *G11B 20/10527* (2013.01); *G11B 27/005* (2013.01); *G11B 27/34* (2013.01); *H04N 1/00933* (2013.01); *H04N 1/215* (2013.01); *H04N 1/2112* (2013.01); *H04N 1/2141* (2013.01); *H04N 5/232* (2013.01); *H04N 5/772* (2013.01); *G11B 2020/10537* (2013.01); *G11B 2020/10638* (2013.01); *G11B 2020/10712* (2013.01); *G11B 2020/10759* (2013.01); *H04N 2101/00* (2013.01); *H04N 2201/0084* (2013.01)

(58) Field of Classification Search
USPC ................ 386/223–224, 228–229, 239–248
See application file for complete search history.

(56) References Cited

U.S. PATENT DOCUMENTS

| | | | | |
|---|---|---|---|---|
| 4,939,652 A | * | 7/1990 | Steiner ................ | G07C 5/0858 340/438 |
| 5,995,936 A | * | 11/1999 | Brais .................... | G02B 27/017 369/25.01 |
| 6,009,036 A | | 12/1999 | Takasugi | |
| 6,307,526 B1 | * | 10/2001 | Mann .................... | G02B 27/017 345/7 |
| 6,847,336 B1 | * | 1/2005 | Lemelson .......... | A61B 1/00048 345/8 |

(Continued)

FOREIGN PATENT DOCUMENTS

| | | |
|---|---|---|
| EP | 01017240 | 5/2001 |
| JP | 2006-127206 | 5/2006 |

(Continued)

*Primary Examiner* — Hung Q Dang

(57) ABSTRACT

A system and method allows a user to enter a command capture audio, video, and/or still pictures that commence at a moment in time earlier than entering the command.

25 Claims, 5 Drawing Sheets

(56) References Cited

U.S. PATENT DOCUMENTS

| | | | |
|---|---|---|---|
| 6,879,340 B1 | 4/2005 | Chevallier | |
| 2002/0005895 A1* | 1/2002 | Freeman | H04N 5/772 348/143 |
| 2002/0085843 A1 | 7/2002 | Mann | |
| 2002/0191952 A1 | 12/2002 | Fiore et al. | |
| 2003/0040917 A1 | 2/2003 | Fiedler | |
| 2003/0081935 A1* | 5/2003 | Kirmuss | H04N 7/18 386/327 |
| 2004/0013406 A1 | 1/2004 | Barton et al. | |
| 2004/0028381 A1 | 2/2004 | Kim | |
| 2004/0039838 A1 | 2/2004 | Gopalakrishnan | |
| 2004/0156616 A1* | 8/2004 | Strub | G11B 27/031 386/224 |
| 2004/0172177 A1 | 9/2004 | Nagai et al. | |
| 2006/0018630 A1* | 1/2006 | Jacovi | H04N 5/76 386/213 |
| 2006/0045468 A1 | 3/2006 | Okazaki et al. | |
| 2006/0077256 A1* | 4/2006 | Silvemail | G07C 5/0891 348/143 |
| 2006/0164534 A1* | 7/2006 | Robinson | H04N 5/232 348/333.01 |
| 2007/0270182 A1* | 11/2007 | Gulliksson | H04N 1/00413 455/556.1 |
| 2008/0144906 A1* | 6/2008 | Allred | A61B 5/0059 382/131 |
| 2013/0202274 A1 | 8/2013 | Chan | |
| 2015/0234787 A1 | 8/2015 | Itamoto | |
| 2015/0373617 A1 | 12/2015 | Cho et al. | |
| 2017/0059265 A1* | 3/2017 | Winter | F41A 17/08 |
| 2017/0078767 A1 | 3/2017 | Borel et al. | |
| 2017/0284754 A1* | 10/2017 | Chakraborty | F41J 5/10 |
| 2018/0176607 A1 | 6/2018 | Shaw et al. | |

FOREIGN PATENT DOCUMENTS

| | | |
|---|---|---|
| KR | 10-2000-0047062 | 7/2000 |
| KR | 10-2000-0051776 | 8/2000 |
| WO | WO 92/22983 | 12/1992 |

* cited by examiner

RECORDER AND METHOD FOR RETROSPECTIVE CAPTURE

CROSS-REFERENCE TO RELATED APPLICATIONS

The present application is a Continuation of U.S. patent application Ser. No. 12/554,656, entitled "RECORDER WITH RETROSPECTIVE CAPTURE", filed Sep. 4, 2009, now pending; which application is a Continuation of International Application No. PCT/US2008/03174, entitled RECORDER WITH RETROSPECTIVE CAPTURE, filed Mar. 7, 2008, which claims priority from U.S. Provisional Application No. 60/905,746; entitled RECORDER WITH RETROSPECTIVE CAPTURE; filed Mar. 7, 2007; each of which, to the extent not inconsistent with the disclosure herein, is incorporated herein by reference.

BACKGROUND

In the use of conventional digital still cameras, conventional video cameras, and conventional sound recorders, the user may be disappointed because they fail to activate the shutter or record command button just prior to or substantially simultaneously with a scene, utterance, or other real time event desired to be recorded. This disappointment may arise because the user does not anticipate the real time event prior to its occurrence or is otherwise distracted and does not press the shutter or record button in time to record the event.

In other cases where recording is substantially continuous, the resultant recording is so voluminous as to defy a cursory attempt to find the portion of the recording corresponding to a real time event at a subsequent viewing, listening or editing session. Instead, the user must search, frequently rather laboriously, to find the fleeting event in the voluminous entirety of the recording.

In still other cases, even when a real time event is captured, a recording of events leading up to the real time event is not captured, and thus context corresponding to the captured scene, utterance, or other real time event may be lost.

OVERVIEW

In a first embodiment according to the invention, a recording apparatus captures a signal and sends it to a memory, such as a first-in-first-out (FIFO) memory, cache or storage device that provisionally captures a real time event. Data corresponding to signals that are sent to the provisional capture memory, also referred to as provisional data, eventually overflows and is discarded unless a shutter or record command, also referred to as a trigger signal, is received. The trigger signal causes the provisional data to be retained, for example by transferring the provisional data to non-volatile memory or storage, or by retaining the provisional data in the provisional capture memory.

A user of the recording apparatus may thus capture records of events that happened prior to triggering capture.

According to some embodiments, the provisional data will continue to be transferred to non-volatile memory or storage or continue to be retained in the provisional capture memory until a timeout is encountered or until the user enables a second trigger event. The timeout or second trigger event may toggle the apparatus back to the provisional capture mode, also referred to as the overflow mode.

According to another embodiment, a recording apparatus captures an event as a signal and transfers it to storage or non-volatile memory for retention. A trigger signal may be received to mark a particular portion of the recorded signal. The trigger events may be logged in a variety of ways, including but not limited to steganographic insertion into data corresponding the signal, recording into a controller track, recording into a look-up table (LUT), recording into the data as a visible or audible mark, etc.

Various forms of recording devices may be used, including but not limited to a digital still camera, a video recorder, an audio recorder, etc.

According to one embodiment, the recording device is a camera mounted on the user. Such a camera may be bore-sighted with the user's field of view to record events in the direction of the user's gaze. A bore-sighted camera may capture signals as video, as a series of still images, or both. A bore-sighted camera may further capture audio.

According to another embodiment, the recording device is a video or still camera that is not bore-sighted. Such a device may be aimed by a user or mounted remotely to capture a desired field-of-view.

According to another embodiment, the recording device is an audio recorder. The retrospective triggering of the audio recorder may be used to mark important portions of a recording to facilitate later search and/or parsing of the recorded signal.

Various trigger apparatuses may be used according to embodiments. For example, a user may select a trigger event by pressing a button, uttering a phrase, making a movement, blowing a puff of air, creating an audio click, creating a signal continuity or discontinuity, or other triggering methods as are known to the art.

DETAILED DESCRIPTION

Figure 1:
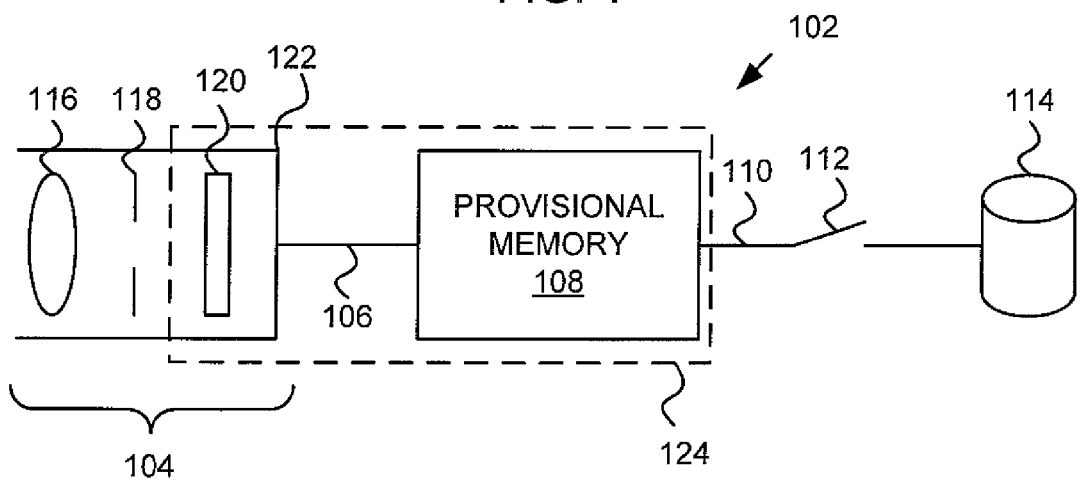
FIG. 1 is a block diagram of a retrospective recorder, according to an embodiment.

In the following detailed description, reference is made to the accompanying drawings, which form a part hereof. In the drawings, similar symbols typically identify similar components, unless context dictates otherwise. Other embodiments may be used and/or and other changes may be made without departing from the spirit or scope of the disclosure.

A numbering convention to facilitate easy understanding by the reader is used herein. Figures are numbered in conventional consecutive order. Specific features are generally indexed consecutively using three or four digit numbers in the order described. The first one or two digits correspond to the figure number in which the feature is first described.

Features having similar functionality generally retain their originally assigned number throughout, even though their physical or logical appearance may vary considerably from figure to figure.

As used herein, the terms image, recorder, and image signal may refer respectively to various observable phenomena, devices or transducers for capturing such phenomena, and signals output by such capture apparatuses or devices corresponding to the captured phenomena. For example, in an illustrative embodiment, an image may include a visible field-of-view, a corresponding recorder may include a digital camera, and the corresponding image signal may include an electrical signal carrying the captured data, such as a serial or parallel sequence of voltage or current transitions communicated from the digital camera to a buffer memory or a storage apparatus. The image may be still or video and/or may include audio. According to another illustrative embodiment, the image may be purely audio with the recorder being a microphone and the image signal being, for example, an electrical representation of the microphone output. To facilitate ease of understanding the term "image" may be used as shorthand to indicate both an original real-time observed phenomenon and an electrical signal or data representative of the observed phenomenon.

As used herein, the term "permanent" is used not only to denote a substantially irreversible action, such as recording an image onto a writable optical disc, but also to denote an action that is permanent in a relative sense, such as recording an image into an area of persistent random-access memory (RAM), recording onto flash memory, writing to rotating magnetic memory, etc. Thus, references to "storage" may be taken to include both conventional storage apparatuses and media such as a hard drive, and to functionally persistent memory such as, for example, a volatile memory device that is refreshed to keep the image in memory for more than a relatively transient duration.

Referring now to FIG. 1, an embodiment of a retrospective recorder 102 is shown in block diagram form. A capture apparatus 104, here illustrated as a digital camera or video recorder, may be operable to output an image signal representative of a captured image to a provisional memory 108 via a data channel 106. For example, the image signal may include a raw or compressed stream of video frames, such as in AVI video envelopes. According to an embodiment, the image data may be loaded into the memory 108 as a sequence of linked groups, each group including a reference frame and a header formatted for playback starting from the present group. According to an embodiment, the memory 108 may be configured as a first-in-first-out (FIFO) buffer memory configured to overflow the oldest group for each new group received. The memory 108 may be configured to substantially continuously accept image signals from the image capture apparatus 104.

The data channel 106 may be considered to transmit "provisional" images from the image capture apparatus 104. Similarly, the memory circuit 108 may be considered to include "provisional memory" configured to temporarily hold provisional image data corresponding to provisionally captured video images. According to embodiments, the provisional memory 108 may include a first-in-first-out (FIFO) memory configured to overflow the oldest data or a circular buffer configured to overwrite the oldest data, for example For the example of FIG. 1, capture apparatus 104 is shown as a digital camera that includes a lens 116, an aperture 118, and a light sensor array 120, all held in alignment by housing 122. As may be seen, such an apparatus may include a conventional digital still or digital video image sensor, and may be constructed according to a range of architectures.

When provisional capture is initiated, an image signal begins to be transmitted from the capture device 104 over signal line, node, or terminal 106 to memory circuitry 108. As time progresses, memory 108 fills up and the first-captured image is shifted out of the memory 108 through node or terminal 110 and is discarded. Alternatively, the newest provisionally captured image may overwrite the oldest provisionally captured image.

The data capacity of, and hence the amount of time for which provisional images are temporarily held in memory 108 may be determined according to application requirements, recorder cost and size constraints, power consumption, etc. For the case of a series of discrete images, the data capacity of memory 108 affects the number of discrete images that may be temporarily held. According to some embodiments, the provisional memory 108 capacity may be dynamically allocated according to user preferences, image attributes, or other operational considerations.

Furthermore, the rate of provisional image capture performed by the capture apparatus 104 and the quality of the provisional images captured by the capture apparatus 104 may be dynamically determined according to user preferences, image attributes, sensed values (e.g. acceleration, finger pressure, etc.), or other operational considerations.

According to an embodiment, at least a portion of the image capture apparatus 102 including the image sensor 120, the image signal line, node, or terminal 106, and the provisional memory circuitry 108 may be integrated into a module 124, such as an integrated circuit. An integrated embodiment, which may optionally include processing logic such as image compression hardware (not shown) and local control logic such as a state machine (not shown), may be advantageous with respect to size, power consumption, cost, etc. and may allow the apparatus to remain in a provisional capture state for a relatively extended period of time with minimal battery requirements. According to an embodiment, an apparatus operable to draw power from the environment, such as a photovoltaic apparatus, heat pump, electromechanical inductive charger, etc. (not shown) may be coupled to a capture apparatus 104, optional compression hardware (not shown), provisional memory 108, and other optional components such as control logic, sensor(s), etc. (not shown) to remain in the provisional capture state for extended periods of time.

As may be appreciated, the memory 108 at any instant in time after initiation of the provisional capture state holds a record of previously received images. In the case of a digital video camera, such a historical record may include, for example, 1 to 60 seconds of previously captured images. As indicated above, such previously recorded images are written-over or overflowed and discarded while the system stays in the provisional capture state of operation.

In the event a user decides that the images are to be saved, the overflow terminal 110 may be operatively coupled to a storage element 114 by a coupling device 112. The coupling device may, for example, be actuated by a user command such as a shutter button or trigger press. When the coupling device 112 couples the output terminal to a storage element 114, the provisional images are transmitted out of provisional memory 108 and into storage 114. In the example of FIG. 1, this event may be envisioned as closing a user-activated switch 112 to couple the output line 110 of memory 108 to storage element 114. Alternative interfaces between memory 108 and storage 114 such as bus-mediated serial or parallel data transfer; transistors, relays, or other controllable connections, etc. may be used. Images coupled to storage 114 are thus captured "permanently" as with a conventional digital camera or digital video recorder.

The period during which images are cached in memory 108, inter alia, allows a user time to respond to and record a dynamic event that would otherwise have been missed. To a user, pressing the shutter button or trigger performs what seems like capturing an image of the past (or at least capturing data beginning from a moment earlier than the real time moment the user activated the coupling device 112).

Thus, according to embodiments, baby's first steps, an athletic achievement, a spectacular "wipe-out", a noteworthy quote, or other transient event may be captured without requiring storage and later editing of large amounts of data. According to embodiments, a portable image or voice capture system may remain in provisional capture mode for an extended period of time without allocating large amounts of non-volatile memory to data that would need to be later deleted. Non-volatile memory or storage is only allocated to image (audio, etc.) storage when the provisionally captured real time event possesses qualities that the user judges to merit allocation of non-volatile memory or storage.

As indicated above, the capture apparatus 104 and provisional memory 108 may, according to some embodiments, be integrated and made very low power. Actions that require more power, such as transmitting and/or permanently storing the image signal, may thus be eliminated during provisional image capture, reducing overall power consumption and enhancing battery life compared to conventional recorders that only permanently record images.

According to embodiments, the capture apparatus 102 and other variants may include a digital hand-held still camera, a digital hand-held video camera, a camera phone, a computer with web-cam, a digital voice recorder, a head-mounted camera, a wireless headset, or other apparatus with a recording capability.

Figure 2:
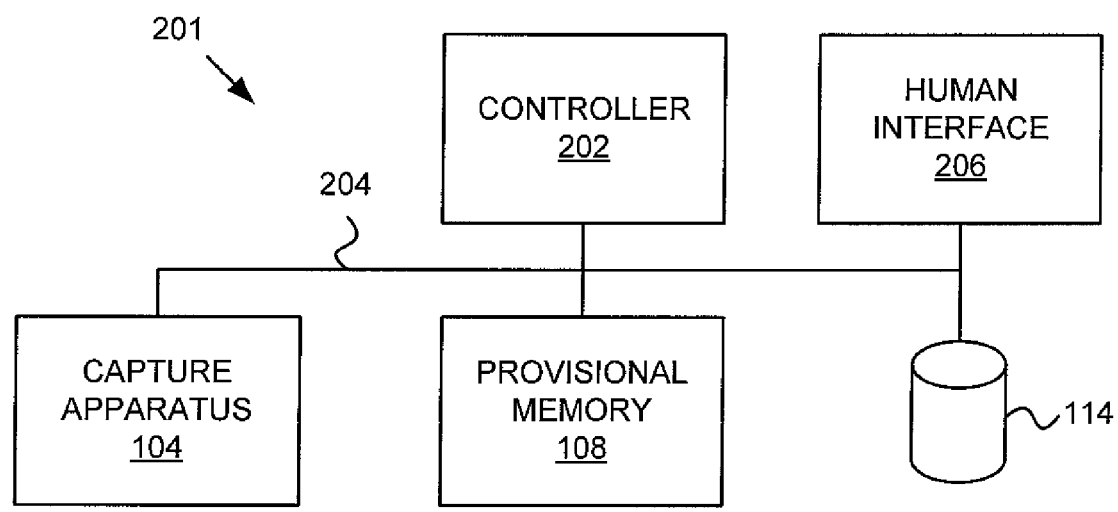
FIG. 2 is a block diagram of a retrospective recorder, according to another embodiment.

FIG. 2 illustrates a retrospective recorder 201 having an electronic controller 202, such as a microcontroller, interconnected with the capture apparatus 104, provisional memory 108, human interface 206, and storage apparatus 114 via a bus 204. According to an embodiment, the human interface may include a record switch, shutter button, trigger, etc. configured to select the operating mode. When the user selects a provisional capture mode, the captured signal from the capture apparatus 104 may be loaded into the provisional memory 108, which then overflows or is overwritten while the retrorespective recorder 201 remains in provisional capture mode. When the user recognizes that the real time actions (which have been provisionally captured) warrant permanent recording, the user may activate the human interface to change to a recording mode of operation. When the record mode is entered, provisional data from the provisional memory may be transferred to storage memory 114 as the capture apparatus 104 continues to capture the action.

For example, in the record mode, the microcontroller 202 may transfer provisional images from the provisional memory 108 to the storage 114 across the bus 204. Alternatively, for embodiments where provisional image memory and the image storage are implemented as one or an array of physical devices, microcontroller 202 may, when a "record" command is received, allocate memory holding provisional images as storage to prevent the images from being written-over.

Figure 3:
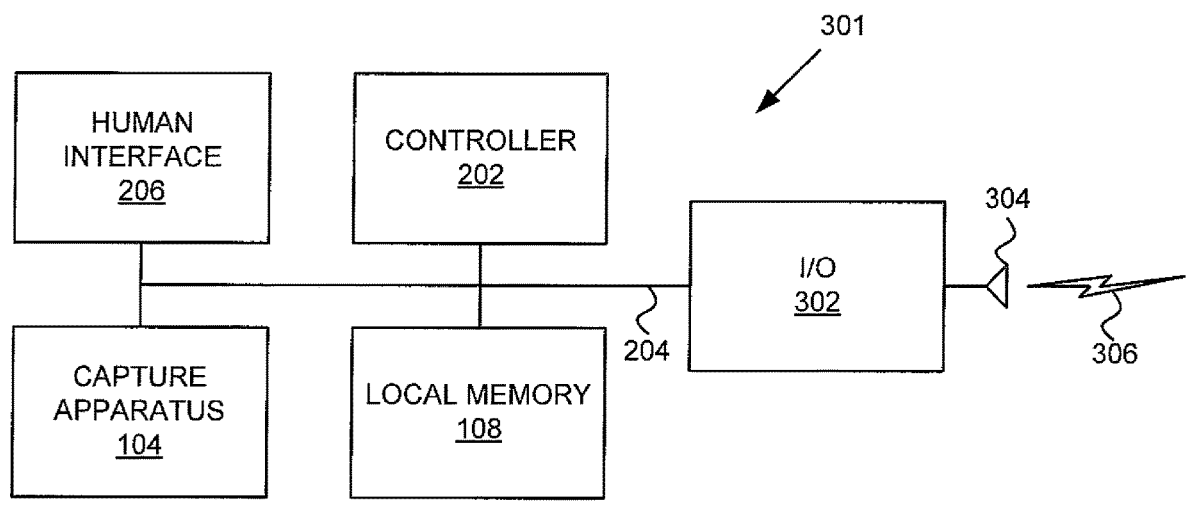
FIG. 3 is a block diagram of a retrospective recorder having local memory and an interface to remote image storage, according to an embodiment.

FIG. 3 illustrates a retrospective recorder embodiment 301 including a local capture apparatus 104, local memory 302, a local controller 202, a human interface 206, and a data interface 304 coupled together by a data bus 204. A portion of the local memory 302 may be configured as provisional memory. According to one embodiment, another or a selectable portion of the local memory 302 may be configured as permanent storage. According to another embodiment, the apparatus 301 may be substantially devoid of permanent image memory and instead, when a user command to enter record mode is received through the human interface 206, provisionally captured images are transferred out through the data interface 304 as an output signal 308. The data interface is here exemplified by a wireless interface, such as a transmitter/receiver, having an antenna 306 that is configured to transmit the image data as modulated radio signal 308. Images selected for retrospective capture may thus be permanently retained on remote storage (not shown).

According to one illustrative embodiment, the retrospective recorder 301 is embedded in a wireless communication device such as a cellular telephone, and the modulated radio signal 308 represents transmission to a conventional cellular telephone system. According to another exemplary embodiment, retrospective recorder 102 is configured as a head-mounted and/or bore-sighted video camera, and modulated radio signal 308 represents a short range signal such as a Bluetooth link, IEEE 802.11 link or other wireless link to a nearby receiving and storage apparatus. According to other embodiments, a wired interface, an infrared interface, or other non-radio interface may be substituted for the radio interface illustrated in FIG. 3.

Figure 4:
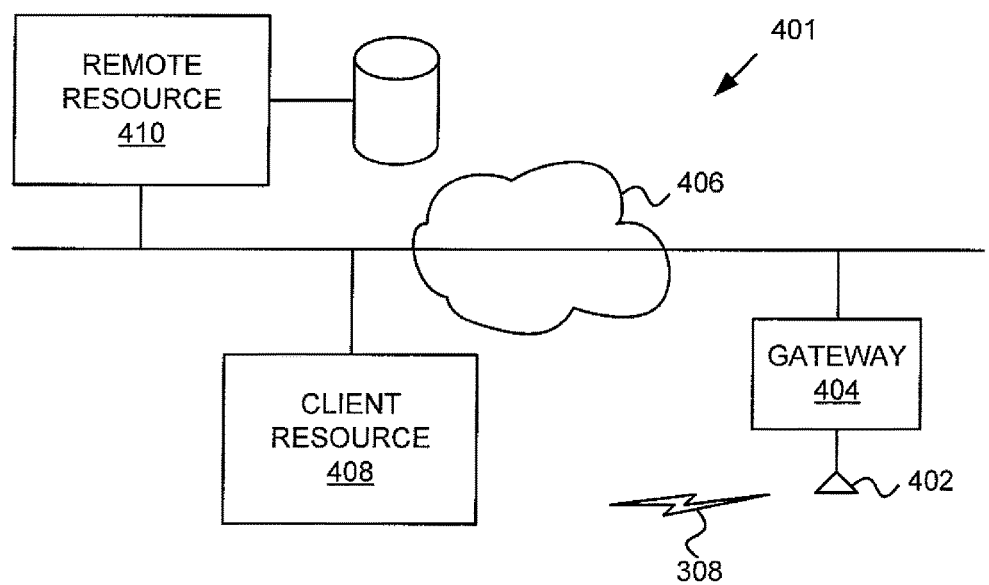
FIG. 4 is a diagram of a network equipped to receive an image from a retrospective capture device, according to an embodiment.

FIG. 4 illustrates a receiving device or network for receiving image data from a remote retrorespective recorder recording device such as shown in the illustrative embodiment 301 of FIG. 3. A gateway 404, which may be a base station, a cellular receiver, an embedded interface in a portable storage device, or other embodiment, receives a wireless signal 308 containing image data through an antenna 402. The gateway 404 may transmit the received image data across an optional network 406. The image signal may be received by a client computer 408, by a server 410, or other entity. As mentioned above, in some embodiments the system 401 may be replaced by a local receiving and storing device such as a personal computer, personal data assistant, MP3 player, or other apparatus equipped to receive and record image signals.

Figure 5:
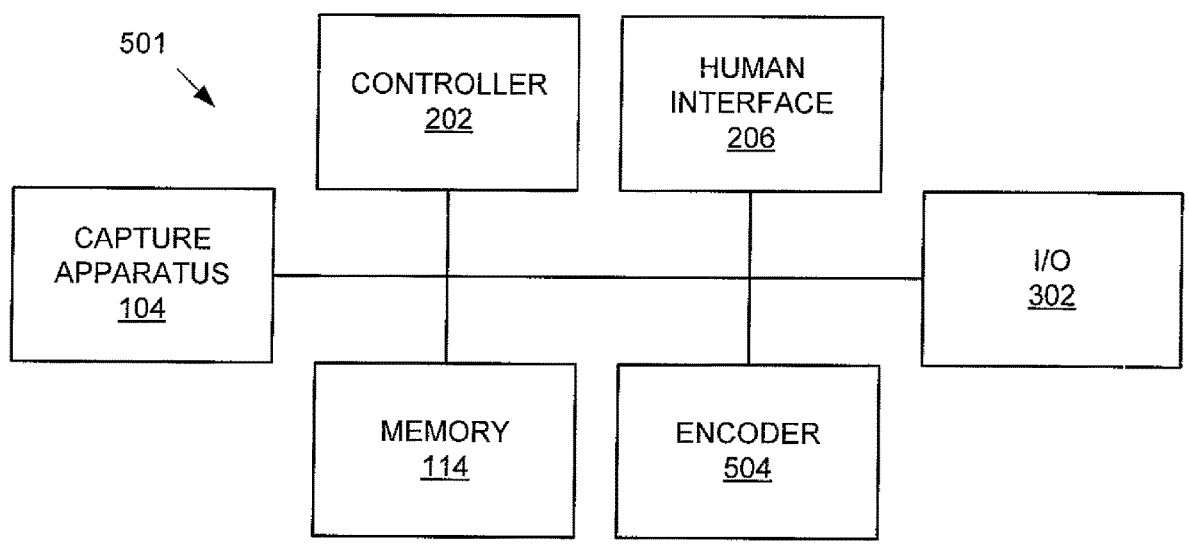
FIG. 5 is a block diagram of a retrospective recorder having an integrated memory, according to an embodiment.

FIG. 5 illustrates an alternative embodiment of a retrorespective recorder 501 that does not use physically- or logically-separated provisional memory 108. Instead, a stream of images is captured by an image capture apparatus 104 and, under control of microcontroller 202, is recorded into storage 114. A user may, upon witnessing a noteworthy event, activate trigger 502. The trigger signal is received by microcontroller 202, and microcontroller activates encoder 504. According to an illustrative embodiment, an encoder 504 creates a mark indicating a moment in time and encodes the mark over the image stream in storage 114, such as by steganography. Alternatively, a mark may be encoded in an index or other facility out-of-band with respect to the recorded image signals in storage 114. Such out-of-band marks may be physically stored in storage 114 or may be stored in a separate physical apparatus. Thus, the marks provide sorting of images and may facilitate later editing and/or selection of images by directing the editor's or viewer's attention to those portions of images that were deemed noteworthy at the time of recording.

According to an embodiment, the mark references a moment in the image stream earlier than the real time moment the user activates the trigger.

According to embodiments, the image stream may consist of or include audio information.

Figure 6:
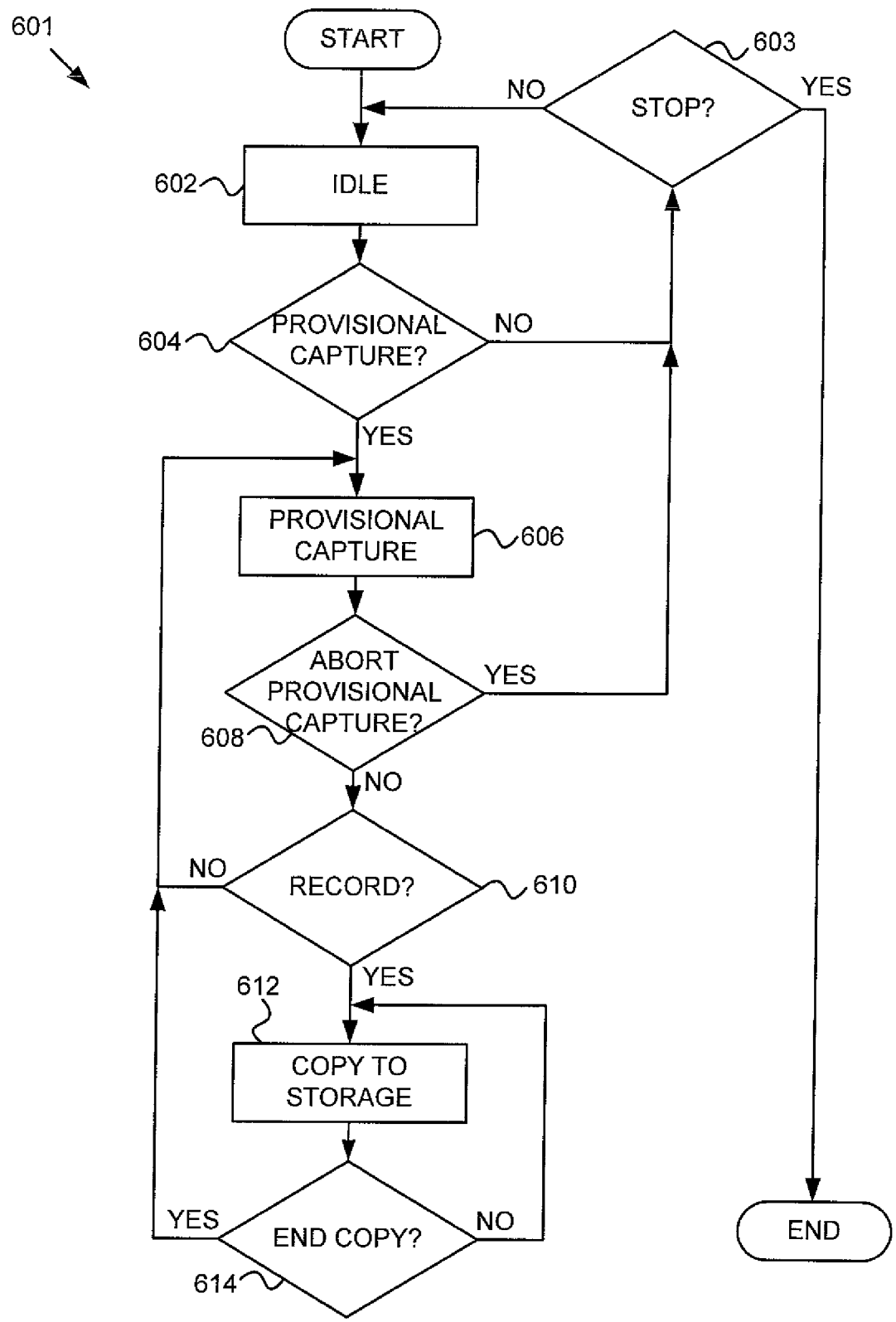
FIG. 6 is a flowchart illustrating logic for retrospectively recording according to an exemplary embodiment.

FIG. 6 is a flowchart illustrating exemplary logic 601 for moving between provisional recording and permanent recording. As shown, the recorder enters an idle state 602 when powered. In the idle state 602, the system may light meter the scene, automatically focus, zoom, set audio sensitivity, etc. Proceeding to decision step 604, system checks to determine if it has been triggered to enter a provisional capture state 606. If not instructed to enter a provisional capture state 606, the system proceeds to decision step 603 where the logic checks to determine if a stop or shutdown command has been received. If a stop command has been received, the process ends, for example by performing a shut-down or entering a sleep mode. If the stop command has not been received, the system re-enters the idle state 602.

If provisional capture is selected in decision step 604, the retrospective recorder enters provisional capture mode 606. In provisional capture mode, images, audio, etc. are provisionally captured by a capture apparatus and a temporarily cached in a provisional memory circuit as provisional data. For the case of substantially continuous images such as video or audio, images may be temporarily cached as streaming data types. For the case of discontinuous images such as where the image capture device is a digital still camera (in still camera mode), discrete images are capture by the image capture device at a frame rate that may be selected by the designer or user according to preferences, and provisionally saved as one or more of a series of discrete images.

While in the provisional capture mode 606, the system monitors inputs in decision step 608 to determine if the user wishes to abort provisional capture mode 606. If an abort command is received, the process proceeds to decision step 603, from there either back to the idle state 606 or to the shutdown or sleep state as described above. If no abort command is received, the process proceeds from step 608 to step 610, where it is determined if a command has been received to enter the record state 612. If not, the system returns to the provisional capture state 606.

If user input is received (indicating that the user wishes to permanently record the provisionally captured image or images), the process proceeds to step 612. In step 612, the system may copy images from the image cache into storage starting with the earliest provisional image. Alternatively, the shutter button or trigger input may act as a command to capture the current image at a high resolution and to transfer lower resolution provisional images to storage. Thus, a high resolution digital image may be accompanied by an earlier (and later) series of image showing events leading up to the image, set-up, posing, etc.

When the system or user issues a command to permanently store provisionally captured images as detected in decision step 610, the system enters a storage mode 612 where one or more previously captured images are written to permanent storage or otherwise designated as permanent images. Such action may be embodiment by physically copying the image signal to a separate storage device or physically segregated region of memory. Alternatively, such action may be embodied by designating regions of memory for storage of the provisionally captured images currently held.

When in storage mode 612, the system monitors for a command to end storage in decision step 614 and return to provisional capture mode 606. According to some embodiments, such a command may be interpreted as arising from release of a shutter button or trigger. Alternatively, the command to exit the storage mode may be made by a second depression of the shutter button or trigger. Alternatively, such a command may be interpreted as arising from storing all images that were substantially in the cache at the moment in time the record command 610 was received. Alternatively, the images from the capture apparatus may continue to be communicated to the storage apparatus for a timed period. Other alternatives will be apparent to those skilled in the art.

Figure 7:
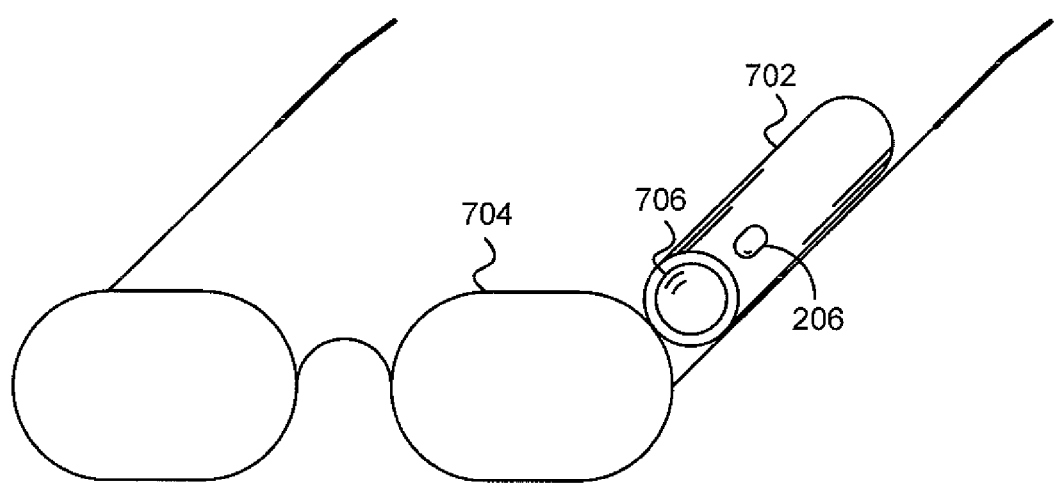
FIG. 7 is a diagram illustrating a head-mounted camera configured for retrospective recording, according to an embodiment.

FIG. 7 is a perspective view of a head-mounted and/or bore-sighted retrospective recording camera 702 mounted on eyewear 704 that may be worn by a user. The illustrative eyewear 704 may be substituted for by a helmet, headset, harness, etc. that may be worn by a user. Camera 702 includes a lens 706 for receiving and focusing light from a scene witnessed by the human wearer and a human interface 206 embodied as a button on the body of the retrospective recording camera for selecting operating modes. For example, a single click indicates the user wishes to enter provisional capture. A second single click indicates the user wishes to record. In some embodiments, an extended click causes images to be permanently recorded for as long as button 206 is depressed. In other embodiments, a second click initiates permanent recording, and images are streamed out of local memory until an "exit record mode" command is issued, such as by another click when in record mode to indicate that the user wishes to exit record mode and resume provisional capture mode. A double click may indicate that the user wishes to abort provisional capture and enter idle mode or power down the head-mounted camera 702. As illustrated in FIG. 7, the head-mounted camera may include a wireless interface for transmitting images to a remote storage apparatus. Alternatively, some or all of the storage memory may be disposed within the camera 702.

A system may include a remote storage apparatus (not shown) having integrated wireless interface, logic for receiving images across the wireless interface, and storage. The remote storage apparatus may be carried in a pocket, held by a belt clip, or otherwise retained on the body of a user. The user may, for instance, simultaneously wear the head-mounted camera apparatus 702.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A recording method for capturing events observed directly by a user, the method comprising:

positioning a portable video recorder, which is positioned on an item worn by the user, to correspond to a field of view of the user;

starting a portable video recorder after power-on to enter a ready state, the portable video recorder including at least a capture apparatus, a provisional memory, and a permanent memory;

after receiving a user-initiated provisional video capture signal, entering the portable video recorder into a provisional capture mode, and continuously capturing a stream of images using the capture apparatus of the portable video recorder;

storing the captured stream of images in the provisional memory of the portable video recorder on the item worn by the user;

holding frames comprising the images of the stream of images only for a period of time as provisional data in the provisional memory included in the portable video recorder;

receiving a first user-initiated trigger signal and, upon receiving the trigger signal, creating a mark indicating content of the provisional memory starting from a time T0 earlier than the first user-initiated trigger signal;

transferring, into the permanent memory, the content of the provisional memory starting from the time T0 based on the mark and extending forward in time continuously to a later time, an interval of continuous permanently-recorded time being defined between T0 and the later time;

wherein T0 is a time of recording of an earliest non-discarded frame stored in the provisional memory at a time T1;

T1 is a time of the first user-initiated trigger signal; and

T2 is a time of a second user-initiated trigger signal; and wherein images captured during time T1 to T2 are recorded on the permanent memory, and images captured during time T0 to T1 are automatically transferred from the provisional memory to the permanent memory, such that images captured during time T0 to T2 are continuously permanently-recorded on the permanent memory.

2. The method of claim 1, wherein the end-storage command consists of the second user-initiated trigger signal made by a release of a shutter button.

3. The method of claim 2, wherein the step of holding each image of the stream of images as provisional data includes at least one selected from the group consisting of writing the provisional data to a FIFO memory configured to overflow the oldest provisional data as new provisional data is added, and writing the provisional data to a circular buffer wherein the oldest provisional data is overwritten by the newest provisional data.

4. The method of claim 1, wherein the period of time, over which each image of the stream of images is only held, equals T1-T0, and further comprising a step of discarding an image held in the provisional memory after that image has resided in the provisional memory for the period of time.

5. The method of claim 1, wherein the step of transferrin to a permanent memory the content of the provisional memory includes transferring the provisional data from a first memory circuit to a second memory circuit or storage apparatus.

6. The method of claim 5, wherein the second memory circuit or storage apparatus is separate from the portable video recorder.

7. The method of claim 1, wherein the step of transferring into a permanent memory the content of the provisional memory includes saving the provisional data in the same order as received.

8. The method of claim 1, wherein the step of transferring begins at time T1 as triggered by the first user-initiated trigger signal caused by an extended click on a button of the portable video recorder while the button is depressed.

9. The method of claim 1, wherein the step of transferring includes marking the provisional data as saved data in a same storage apparatus.

10. The method of claim 1, further comprising:

receiving a selection of a trigger event from a user, the trigger event including at least one of the user uttering a pre-determined phrase, the user making a pre-determined movement, the user blowing a puff of air, or the user creating an audio click;

wherein receiving a first user-initiated trigger signal is responsive to the user directly observing an event without the aid of the portable video recorder and the user performing the trigger event, the captured stream of images is at least partially based on the event directly observed by the user.

11. The method of claim 1, further comprising:

when storing the captured stream of images in the provisional memory of the portable video recorder on the item worn by the user, preventing at least one of transmission of the stream of images or permanent storage of the stream of images.

12. The method of claim 1, further comprising:

upon receiving the trigger signal, capturing the stream of images at a first resolution between T1 and T2 on the permanent memory;

wherein the stream of images captured from T0 to T1 are on the provisional memory at a second resolution that is lower than the first resolution.

13. A portable video recorder for retrospectively recording images directly viewable by a user, the portable video recorder comprising:

a capture apparatus configured to produce a continuous stream of images, the capture apparatus being mountable on an item to be worn by the user;

a provisional memory disposed within the portable video recorder and configured to receive frames comprising the images of the stream of images as provisional data from the capture apparatus and hold the provisional data for only a period of time after the receipt of the provisional data;

a user-command device; and a controller operatively coupled to the user-command device, the provisional memory, and the capture apparatus, the controller being configured to:

after the portable video recorder is powered-on and enters a ready state, receive a command from the user-command device to enter a provisional capture mode to start capturing the stream of images on the provisional memory, and then to receive a first user-initiated trigger signal from the user-command device to create a mark indicating content of the provisional memory starting from a time T0 earlier than the first user-initiated trigger signal and to transfer into a permanent memory the content of the provisional memory starting from the time T0 based on the mark and extending forward in time continuously to a later time, an interval of continuous permanently-recorded time being defined between T0 and the later time;

wherein T0 is a time of recording of an earliest non-discarded frame stored in the provisional memory at a time T1;

T1 is a time of the first user-initiated trigger signal; and

T2 is a time of a second user-initiated trigger signal; and wherein the later time is greater than the time T1.

14. The portable video recorder of claim 13, wherein the period of time, over which each image of the continuous stream of images is only held, equals T1-T0, and further comprising a step of discarding an image held in the provisional memory after that image has resided in the provisional memory for the period of time.

15. The video recorder of claim 13, wherein the permanent memory is included within the video recorder.

16. The video recorder of claim 15, wherein the permanent memory is removable from the video recorder.

17. The portable video recorder of claim 13, wherein the capture apparatus further comprises a head-mounted camera.

18. The portable video recorder of claim 13, wherein the provisional memory includes at least one selected from the group consisting of
a FIFO memory configured to overflow the oldest provisional data as new provisional data is added, and
a circular buffer configured to overwrite the oldest provisional data with the newest provisional data.

19. The portable video recorder of claim 13,
wherein the capture apparatus includes an image sensor array, and
wherein the image sensor array and the provisional memory are disposed on a single semiconductor die.

20. The portable video recorder of claim 19:
wherein the semiconductor die further includes image compression hardware disposed thereon and configured to compress the continuous stream of images from the image sensor array to produce the provisional data; and
wherein the semiconductor die further includes control logic configured to control the operation of the image sensor array, the image compression hardware, and the provisional memory.

21. The portable video recorder of claim 13, further comprising:
control hardware configured to selectively couple an output from the provisional memory to an output node responsive to receiving a signal from the controller.

22. The portable video recorder of claim 21, further comprising:
at least one data receiving module coupled to the output node, wherein the data receiving module is selected from the group consisting of a storage memory, a flash memory, NVRAM, static RAM, a solid state disk drive, a rotating disk drive, a data interface, a radio transceiver, a radio transmitter, and an infrared interface.

23. The portable video recorder of claim 13, wherein the controller is electronically configured to keep the provisional data in memory when the first user-initiated trigger signal is received by the controller to store the provisional data as permanent data.

24. The portable video recorder of claim 13,
wherein the second user-initiated trigger signal is an end-storage command and is made by a release of a shutter button.

25. The portable video recorder of claim 13, further comprising a frame having the capture apparatus mounted thereto so that the capture apparatus is mountable to the user.

\* \* \* \* \*